W. H. PRITCHETT.
Joint-Fastening for Stair-Rails.

No. 167,118. Patented Aug. 24, 1875.

Witnesses:
G. B. Towles.
H. A. Daniels.

Inventor:
William H. Pritchett
By W. Burris Atty.

UNITED STATES PATENT OFFICE.

WILLIAM H. PRITCHETT, OF ANACOSTIA, DISTRICT OF COLUMBIA.

IMPROVEMENT IN JOINT-FASTENINGS FOR STAIR-RAILS.

Specification forming part of Letters Patent No. 167,118, dated August 24, 1875; application filed March 27, 1875.

*To all whom it may concern:*

Be it known that I, WILLIAM H. PRITCHETT, of Anacostia, in the county of Washington and District of Columbia, have invented certain new and useful Improvements in Nuts and Washers; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The several figures of the drawings represent different ways of using the semi-cylindrical nuts and washers on joint-bolts.

Figure 1:
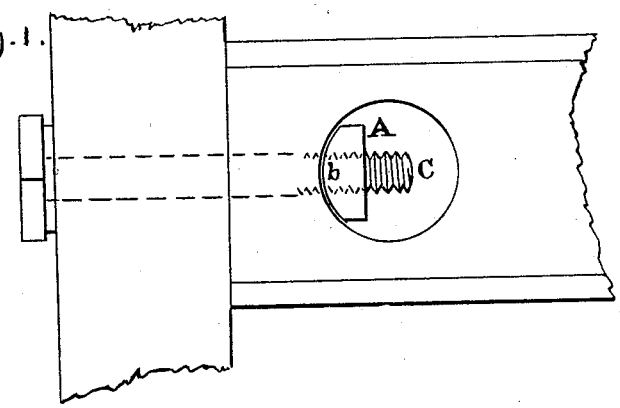
Figure 2:
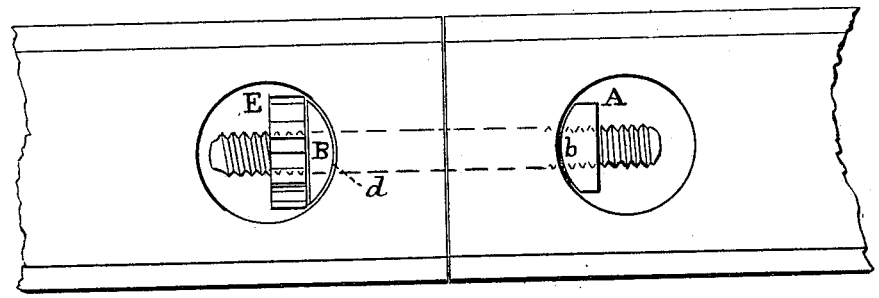
Figure 3:
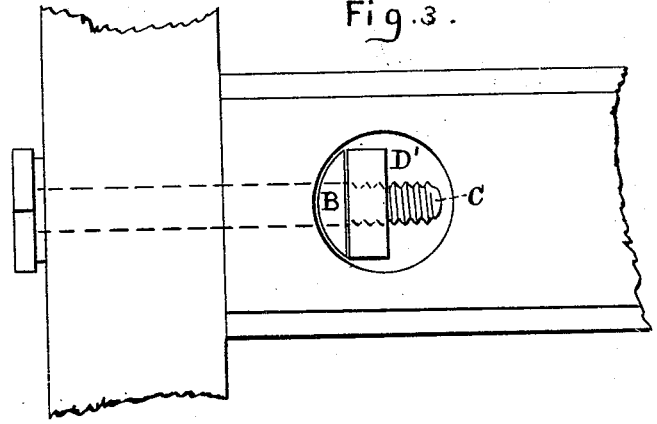

Figure 1 shows a bolt with a nut, and Fig. 3 a bolt with a washer, adjusted in round holes. Fig. 2 shows a joint where the bolt has the nut on one end, and the washer with a flat tightening-nut on the other end.

My invention relates to the joint-bolts and their nuts and washers used in connecting joints where the nut is to be concealed; and the invention consists in combining, with such joint-bolts, nuts, and washers, the bearing sides or faces of which are made semi-cylindrical to fit the round walls of auger-holes or round mortises, in which the nuts and washers are adjusted, to avoid the necessity of square mortises or flat bearing-surfaces, as hereinafter described, and as shown in the drawings.

A represents a nut having a semi-cylindrical side, *b*. B represents a washer having a flat face, *c*, and a semi-cylindrical face, *d*, as shown in the drawings. The employment of these nuts and washers, made, as described, to fit the round walls of auger-holes or round mortises, dispenses with the necessity, and saves the extra time and labor, of making square mortises or flat surfaces required for flat nuts, and the round holes are more readily plugged. In using flat nuts in such joints, if the bearing-surface of the mortise is not at right angles to the bolt it is liable to be bent by the side pressure of the nut, which sometimes renders it difficult to unscrew and remove the bolt. This liability is avoided by the use of the semi-cylindrical nuts and washers, the bearings of which in the round mortises are more perfect.

The nuts and washers may be used substantially as shown in Figs. 1 and 3, in connecting the joints of cars, carriages, bedsteads, and in all similar joints where the nut is to be concealed, and in joints of stair-rails and other similar joints the nuts and washers are used as shown in Fig. 2 of the drawings.

In a joint where the nut on the joint-bolt is to be concealed, I claim—

1. In combination with a jointed rail, having a round hole or mortise to inclose the nut and washer, the semi-cylindrical bearing-surface of the nut or washer adjusted on the joint-bolt to bear against the walls of the round hole or mortise in the rail, substantially as and for the purpose described.

2. The combination of the nut A, washer B, bolt D, and tightening-nut E, substantially as and for the purpose described.

In testimony that I claim the foregoing as my own invention I affix my signature in presence of two witnesses.

W. H. PRITCHETT.

Witnesses:
G. B. TOWLES,
A. P. LACEY.